MARINUS C. BOKELMAN
WALDEMAR J. MAKUSAY
INVENTORS

BY
Nilsson, Robbins & Anderson
ATTORNEYS

Уnited States Patent Office 3,510,100
Patented May 5, 1970

3,510,100
ZERO LEAKAGE POPPET VALVE
Waldemar J. Makusay, Van Nuys, and Marinus C. Bokelman, Studio City, Calif., assignors to Bell Aerospace Corporation, a corporation of Delaware
Filed July 22, 1966, Ser. No. 567,284
Int. Cl. F16k *31/04, 25/00*
U.S. Cl. 251—138        1 Claim

ABSTRACT OF THE DISCLOSURE

Disclosed is a force motor operated poppet valve adapted to control the flow of fluid through a chamber sealed from the force motor but which utilizes metal to metal poppet-valve seat combination to effect zero leakage. The zero leakage is obtained through the utilization of a poppet assembly wherein the poppet is permitted freedom of movement during the seating mode of operation so as to always fully conform to the seat and effect positive sealing relationship therewith.

---

This invention relates generally to valves and more particularly to poppet valves, more specifically the present invention relates to poppet valves which are adapted for pulse mode operation to control the incremental flow of fluid while maintaining substantially zero fluid leakage through the valve when it is in the closed position. The term "zero leakage" as used throughout this specification and the claim is defined as meaning a leakage of $10^{-5}$ standard cubic centimeters per second of helium gas.

The need in the prior art for a pulse mode operated zero leakage valve to control incremental flow of fluids has been realized for some time. The known prior art solutions to attempt to fill this need have been to utilize a plastic or rubber seat or poppet for the valve and/or to precisely align the seat and poppet during assembly thereof.

The utilization of plastic or rubber in such a valve provides potentially a source of contamination of the fluid which is being controlled by the valve. As is well known in the art, such valves, when they are not energized, automatically return to a closed, i.e. the seat and poppet are in engagement, position. Under such conditions if the valve undergoes a long storage period, the plastic or rubber has a tendency to deform as a result of the pressure and stress applied thereto and therefore loses its capabilities of accomplishing the desired zero leakage seal. It has been determined that a metal-to-metal seal is desirable under these circumstances. However, prior to the present invention the producibility of a metal-to-metal seal was considered extremely difficult and had been deemed so difficult as to render the metal-to-metal seal impractical.

Accordingly, it is an object of the present invention to provide a valve having substantially zero leakage which is adapted to use a metal-to-metal seal.

It is still another object of the present invention to provide a valve having substantially zero leakage and which embodies a metal-to-metal seal which is reproducible and avoids the prior art problems heretofore thought unavoidable with such seals.

It is another object of the present invention to provide a valve having substantially zero leakage which does not require the extremely precise and accurate alignment during assembly thereof which has heretofore been deemed necessary.

It is a further object of the present invention to provide a valve having substantially zero leakage which has a poppet member that automatically aligns itself with the valve seat upon contact therewith to effect a zero leakage seal therewith.

A zero leakage poppet valve for controlling the flow of fluid in accordance with the present invention is particularly adapted for actuation by an electromagnetic force motor and includes a valve seat and a poppet assembly. The poppet assembly further includes poppet means floatingly supported by an actuating arm and adapted to engage the valve seat in a sealing relationship. The poppet means is adapted to move within limits along its longitudinal axis with respect to the actuating arm and to rotate with respect thereto. There is provided first and second restraining means to limit the amount of movement which the poppet means undergoes in each of the two directions along its longitudinal axis. More specifically, when the poppet means is not in engagement with the valve seat, it is permitted to move in a first direction until it engages a restraining means and the poppet means is continuously urged in this first direction. When the poppet means is brought into engagement with the valve seats it is permitted to move in the opposite direction for a period of time sufficient to cause it to automatically align with the valve seat at which time it engages a second restraining means so as to accomplish a positive seal with the valve seat.

Figure 1:
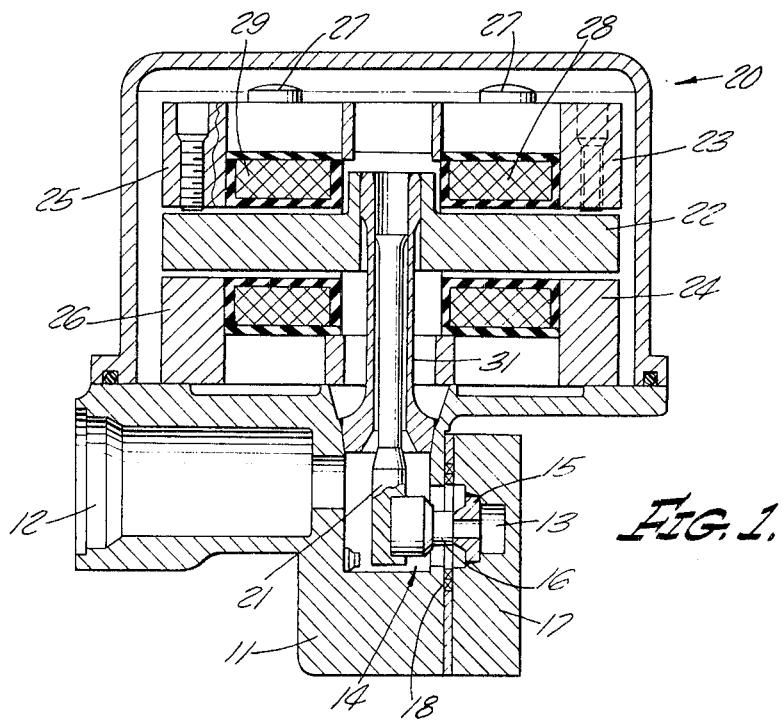
FIG. 1 is an assembly drawing partly in cross-section of a valve embodying the features of the present invention.

By reference to the drawing and particularly to FIG. 1, there is illustrated therein in cross-section a valve constructed in accordance with the present invention and adapted for operation to control the flow of fluid therethrough. As is therein seen, there is provided a valve body 11 having an input opening 12 therein. The fluid to be controlled is applied in any manner desired and known to the art to the input opening 12. The fluid passes through the valve body 11 and exits into a mixing chamber or outlet opening as illustrated at 13 in the valve body. The actual flow of the fluid from the inlet opening 12 to the output chamber 13 is controlled by a valve structure illustrated at 14 and which includes a valve seat 15 and a poppet 16. The valve seat 15 is rigidly held in place, such as by welding upon the portion 17 of the body 11. The portion 17 is held in place upon the body 11 such as by bolting or any other means known to the art and is sealed by sealing rings 18 to preclude the loss of fluid therethrough.

Movement of the poppet 16 toward and away from the valve seat 15 may be accomplished in any manner which is known to the art. However, the valve construction in accordance with the present invention is particularly adapted for use with an electromagnetic force motor such as a conventional torque motor as is illustrated at 20. When such a torque motor is utilized, the poppet 16 is affixed to an actuating arm such as a flapper 21 which in turn engages for operative movement an armature 22. The armature 22 is positioned between pole pieces 23, 24, 25 and 26. The pole pieces 23 through 26 are polarized as is well known in the art by means of permanent magnets (not shown) clamped between the frames as, for example, by bolts 27. Positioned about the armature 22 are coils 28 and 29 which receive electrical signals to cause the armature 22 to move in response to the magnitude and polarity of the electrical signals applied to the coils 28 and 29. As the armature 22 moves, the flapper 21 is also caused to move responsively and in turn actuate the valve.

It should be noted that the torque motor 20 is sealed from that portion of the valve body 11 through which the fluid passes by means of a tubular flexure member 31 as is well known in the prior art. Since the entire structure of the torque motor 20 is well known in the prior art, it is not deemed necessary to provide any additional discussion as to its operation or construction at this point. If further description or understanding thereof is desired, reference may be had to U.S. Pat. Nos. 3,209,782 and 3,221,760.

Figure 2:
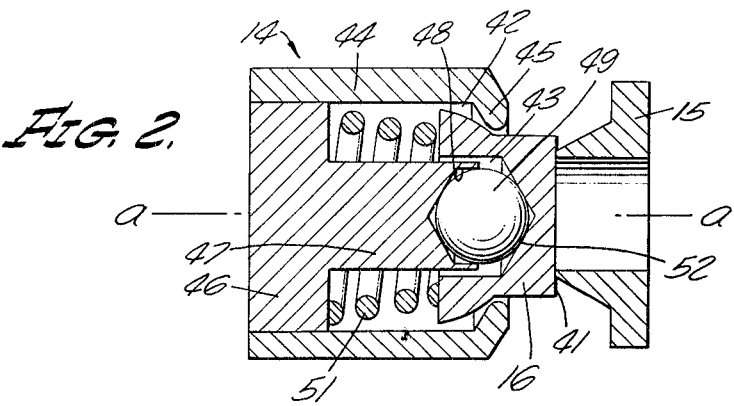
FIG. 2 is a cross-sectional view of a portion of the valve shown in FIG. 1 which illustrates more in detail the alignment features of the valve in accordance with the present invention.

The particular details of the poppet assembly are more clearly illustrated in FIG. 2 to which reference is hereby made. As is therein shown, the poppet 16 is in sealing engagement with the valve seat 15. The poppet 16 includes a surface 41 thereof which preferably is constructed of metal. The mating area of the valve seat 15 also preferably is constructed of metal to thus provide a metal-to-metal seal for controlling the flow of fluid through the valve as described above. As is illustrated, the poppet 16 includes an outwardly flared skirt 42 and defines in the rear surface thereof a recess 43. As should also be noted from FIG. 2, the poppet 16 is adapted to move along its longitudinal axis a—a by a predetermined amount.

There is provided a first restraining means such, for example, as a tubular member in the form, for example, of a right circular cylinder 44 having an inwardly turned flange 45 at one end thereof. The inner surface of the inwardly turned flange 45 is adapted to engage the outer surface of the flared skirt 42 of the poppet 16 to thereby limit the travel of the poppet 16 in a first direction towards the right along its longitudinal axis a—a.

A second restraining means is also provided to limit the travel of the poppet 16 in the opposite direction. In accordance with the presently preferred embodiment of the present invention, the second restraining means takes the form of a base member 46 having a post 47 extending therefrom. The post 47 terminates in a bore 48 which receives a ball member 49 defining a spherical surface. The ball member 49 is received within the recess 43 provided in the rear of the poppet 16. Thus, the second restraining means is positioned adjacent the rear surface of the poppet 16 and engages the same to limit the travel in the opposite direction along the longitudinal axis a—a.

As is also illustrated a resiliently deformable means such as a spring 51 is received within the cylinder 44 between the base 46 and the bottom of the skirt 42 to continuously urge the poppet 16 toward its first direction and into engagement with the valve seat 15.

In operation of a valve as illustrated in FIGS. 1 and 2, when the valve is to be opened a signal is applied to the coils 28 and 29 of such a polarity as to cause the armature 22 to move in a clockwise direction. As the armature 22 moves in a clockwise direction, the cylinder 44 moves toward the left as viewed in FIG. 2 and the flange 45 engages the skirt 42 of the poppet 16 and withdraws the surface 41 from its sealing engagement with the valve seat 15. Fluid within the valve then flows toward the right as viewed in FIG. 2 and out through the chamber 13 (FIG. 1).

When it is desired to close the valve, a signal is applied to the coils 28 and 29 of the opposite polarity to thus cause the armature 22 to move in a counterclockwise direction. As the armature thus moves, the surface 41 of the poppet 16 engages the valve seat 15. As this engagement occurs, the valve seat 16 is stopped in its movement, however, the cylinder 44 continues to move until the ball 49 contacts the rear surface of the poppet 16 at 52. When this occurs, the poppet 16 is permitted to pivot upon the surface of the ball 49 and is thereby caused to completely and automatically align itself with the valve seat 15 and thereby effect a positive zero leakage seal. As additional force is applied by way of the torque motor causing the flapper 21 to continue to move toward the right, the ball further urges the surface 41 of the poppet 16 into engagement with the valve seat 15. It can therefore be seen that the poppet 16 is permitted to move relative to the cylinder 44 along the longitudinal axis a—a within the limits provided by the flange 45 and the ball 49, and to pivot or rotate upon the ball 49, the ball 49 being fixedly retained in place upon the post 47 within the cavity 48, that is, the poppet 16 is floatingly supported by the cylinder 44.

Figure 3:
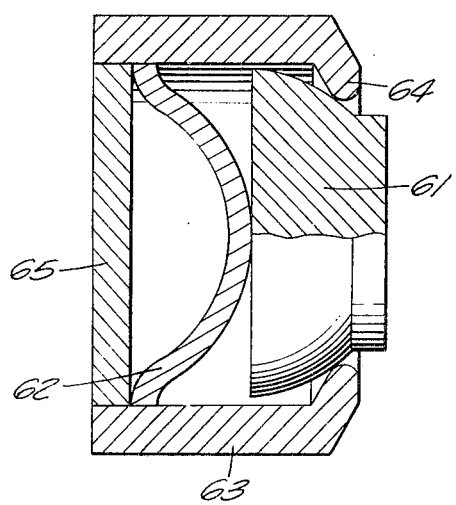
FIG. 3 is a cross-sectional view of an alternative embodiment of a poppet constructed in accordance with the present invention.

The particular structure of the poppet assembly as illustrated in FIG. 2 should not be taken as a limitation upon the scope of the present invention as other embodiments and modifications thereof will become readily apparent to those skilled in the art. For example, as is illustrated in FIG. 3, the poppet 61 may rest upon a wave spring 62 which operates as the resiliently deformable means continuously urging the poppet 61 toward the valve seat as above described and simultaneously operates as a pivot member for the poppet 61 so as to enable it to effectively seal with the valve seat. The restraining member limiting the forward or upward movement as illustrated in FIG. 3 of the poppet again may be a cylinder 63 having an inwardly turned flange 64 and having its opposite end closed with a base 65 upon which the spring 62 rests.

What is claimed is:

1. In a zero leakage poppet valve for incrementally controlling the flow of fluid which is adapted for actuation by an electromagnetic force motor, the improvement comprising:
 (A) a valve seat having a metal surface adapted to receive a poppet in sealing relationship therewith; and
 (B) a poppet assembly carried by an actuating arm operatively connected to said force motor for moving said poppet into and out of said sealing relationship, said poppet assembly including
  (1) poppet means having a metal surface adapted to engage said valve seat metal surface in sealing relationship therewith, said poppet means being movable with respect to said actuating arm, along the longitudinal axis of said poppet means, between first and second limits,
  (2) spring means continuously urging said poppet means towards said first limit along said axis when said poppet means is not in engagement with said valve seat, and
  (3) spherical surface defining means positioned to receive said poppet means at said second limit along said axis when said poppet means is in engagement with said valve seat, said poppet means being free to universally move upon said spherical surface thereby to fully seat and seal upon said valve seat said metal surfaces on said valve seat and said poppet means being the only sealing means against the flow of fluid when said poppet means is at said second limit.

References Cited

UNITED STATES PATENTS

| 1,950,120 | 3/1934 | McKee | 251—86 XR |
| 2,720,212 | 10/1955 | Kimm et al. | 251—86 XR |
| 3,026,082 | 3/1962 | Essig | 251—335 XR |
| 1,991,052 | 2/1935 | Derby | 251—86 X |
| 2,479,688 | 8/1949 | Lindgren | 251—86 |
| 3,101,739 | 8/1963 | Pribonic | 251—86 X |
| 3,326,513 | 6/1967 | Hall | 251—86 |
| 3,373,769 | 3/1968 | Chaves et al. | 251—335 X |

FOREIGN PATENTS 30,043  10/1925  France.

HENRY T. KLINKSIEK, Primary Examiner

U.S. Cl. X.R.

251—86, 335